United States Patent [19]

Deguchi et al.

[11] Patent Number: 5,048,004
[45] Date of Patent: Sep. 10, 1991

[54] OPTICAL RECORDING MEDIUM RECORDING AND REPRODUCING DEVICE

[75] Inventors: Toshihisa Deguchi; Takeshi Yamaguchi, both of Nara; Shigemi Maeda, Yamatokoriyama; Takashi Iwaki, Nara; Tsuneo Fujiwara; Shigeo Terashima, both of Tenri, all of Japan

[73] Assignee: Sharp Kabushiki Kaisha, Osaka, Japan

[21] Appl. No.: 340,454

[22] Filed: Apr. 19, 1989

[30] Foreign Application Priority Data

Apr. 20, 1988 [JP] Japan .................. 63-97491

[51] Int. Cl.⁵ .......................... G11B 27/36
[52] U.S. Cl. ........................ 369/54; 369/58
[58] Field of Search .............. 369/100, 58, 44.29, 369/48, 59, 54

[56] References Cited

U.S. PATENT DOCUMENTS 4,799,208 1/1989 Satoh et al. .................. 369/122
4,949,326 8/1990 Takagi et al. .................. 369/54

FOREIGN PATENT DOCUMENTS

3704213A1 2/1986 Fed. Rep. of Germany .
62-192974 8/1987 Japan .

Primary Examiner—Roy N. Envall, Jr.
Assistant Examiner—Hindi Nabil

[57] ABSTRACT

A recording and reproducing device providing control data recording area on erasable type optical recording medium wherein control data are recorded thereof, characterized in that there is provided a control data recording area forming device for forming control data recording areas having more than two control recording blocks which in turn have more than one recording unit. The control data can be recorded independently. A control data updating device records new control data in the control data recording blocks which were the ones not previously being updated with control data, thereby allowing this device to minimize damage caused by electrical power failure.

16 Claims, 3 Drawing Sheets

OPTICAL RECORDING MEDIUM RECORDING AND REPRODUCING DEVICE

FIELD OF THE INVENTION

The present invention is related to a recording and reproducing device that can write control data, like an error map, on an erasable type optical recording media, like an optical modulation type magneto-optical disk. This recording and reproducing device unit can also update the control data.

BACKGROUND OF THE INVENTION

Among recording and reproducing devices with erasable type optical disks possessing commutability (portability), there are units in which an error map can be written on an individual optical disk. Written within this error map is control data for identifying defective sector and track data, for example, and for writing data to alternate locations when defective sectors/tracks exist. A recording and reproducing device like this is structured so that an error map is read into a RAM located in the unit where the optical disk is inserted. In this manner, an error map access is performed on the optical disk. As a consequence, when a host device and host program access an optical disk via this recording and reproducing device, even if accessing a defective sector, this will not cause problems to the host device because processing automatically shifts to an alternate sector or the like. When a new defective sector is discovered during accessing, or when it becomes necessary to perform new alternate processing, this recording and reproducing device erases and updates the error map.

In conventional optical recording medium recording and reproducing device, the aforementioned error map has been recorded at one specific location on the optical disk.

Now, when rewriting recorded data in an optical modulation type magneto-optical disk recording and reproducing device, it is necessary to erase the area first. Because of this, when an error map is updated in conventional recording and reproducing devices, it is also necessary to record the new error map after erasing the prior error map, which was recorded in the record area of the error map.

Therefore, after erasing the prior error map and before recording the new error map, if for some unexpected reason electric power to the device fails, all contents of the error map will be lost. Such problems have occurred.

If the content of the error map is lost, this may offer no problems concerning defective sectors or tracks, but it is extremely difficult to recover alternate data, and may be impossible to read data recorded at an alternate location.

Even with magnetic modulation type magneto-optical disks, or in phase transition type optical disk recording and reproducing devices, if electric power fails during error map erase processing, possibly the same problem can occur.

SUMMARY OF THE INVENTION

An object of the present invention is to provide an optical recording medium recording and reproducing device that can minimize damage caused by electric power failure et cetera, by storing control data in the recording medium, without being erased or overwritten, even when unit electric power fails.

Another object of the present invention is to provide an optical recording medium recording and reproducing device that can shorten update processing time.

Still another object of the present invention is to provide an optical recording recording and reproducing device that can minimize damage caused by electric power failure, when control data is updated.

A further object of the present invention is to provide an optical recording medium recording and reproducing device that can easily specify a control data recorded block, where the newest control data is recorded, out of more than 2 control data recorded blocks.

Still a further object of the present invention is to provide and an optical magnetic medium recording and reproducing device which can unfailingly record control data.

In order to accomplish these objects, the present invention has the following special features:

In an recording and reproducing device, a control data recording area, control data that indicates optical recording medium conditions is set up in the erasable type optical recording medium. The recording and reproducing device comprises a means to form a control data recording area, which forms control data recording areas where more than two control data recording blocks are set. These control data recording blocks comprise more than one record unit and can independently record control data. The units have a means to update control data which records new control data in a control data recording block. This control data recording block has control data which was not recorded just prior to the updating process. This is the special feature.

The aforementioned control data updating means can be structured so that it records new control data in an unrecorded control data recording block when control data of a control data recording area is updated.

Also, the aforementioned control data updating means can be structured so that when an unrecorded control data recording block does not exist, after new control data was recorded, it erases control data recorded in the control data recording block where the oldest control data was recorded.

Also, the aforementioned control data updating means can be structured so that it records corresponding cyclic code for more than two control data recording blocks in the optical recording medium, together with control data.

Also, the aforementioned control data updating means can be structured so that it records the number of times that control data is recorded in the optical recording medium, together with control data.

Also, the aforementioned control data updating means can be structured so that it records total number of control data to the optical recording medium recording and reproducing device, together with control data.

Also, the aforementioned control data recording forming means forms the control data recording area, where more than two control data recording blocks that comprise more than two record units, are set up. On the other hand, control data updating means can be structured so that it records the same content of control data in more than two record units of a control data recording block.

DESCRIPTION OF THE EMBODIMENTS

Figure 1:
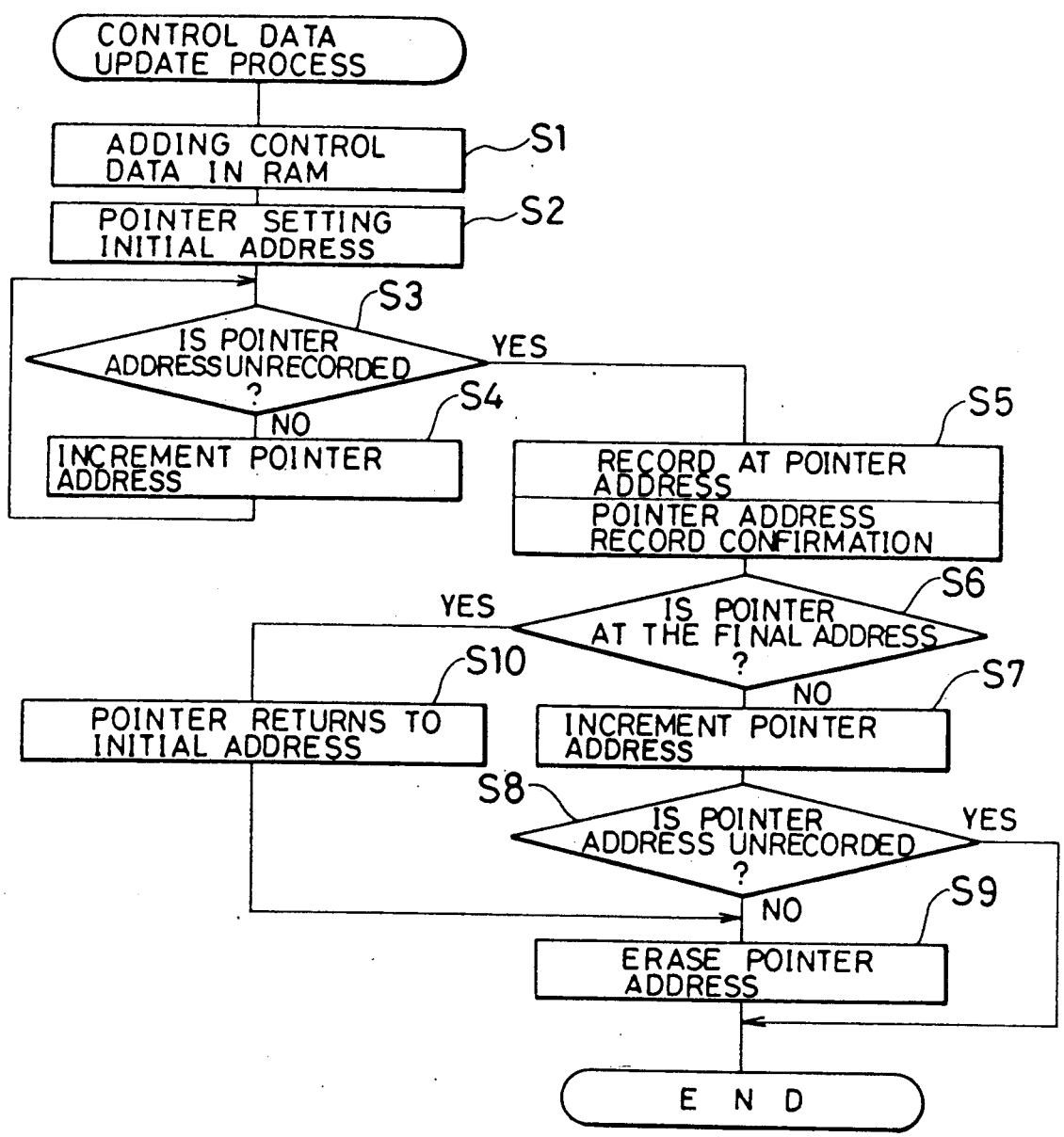
FIG. 1 is a flow chart illustrating control data updating operation in the optical recording medium recording and reproducing device of the present invention.
Figure 2:
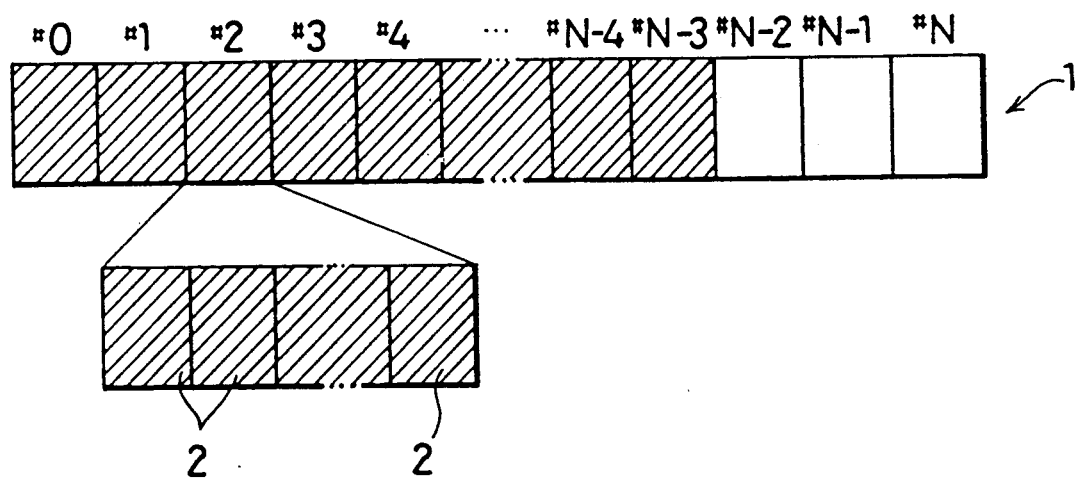
FIGS. 2 (a)(b) are individual maps indicating control data recording areas on the magneto-optical disk.
Figure 2:
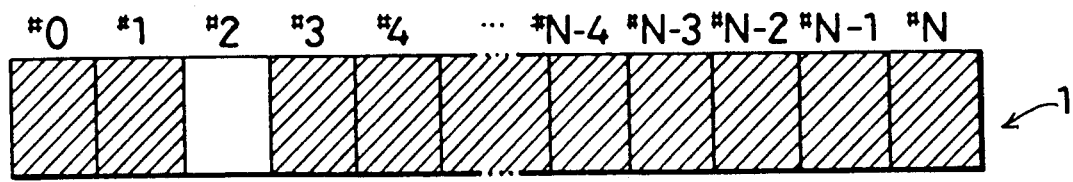
Figure 3:
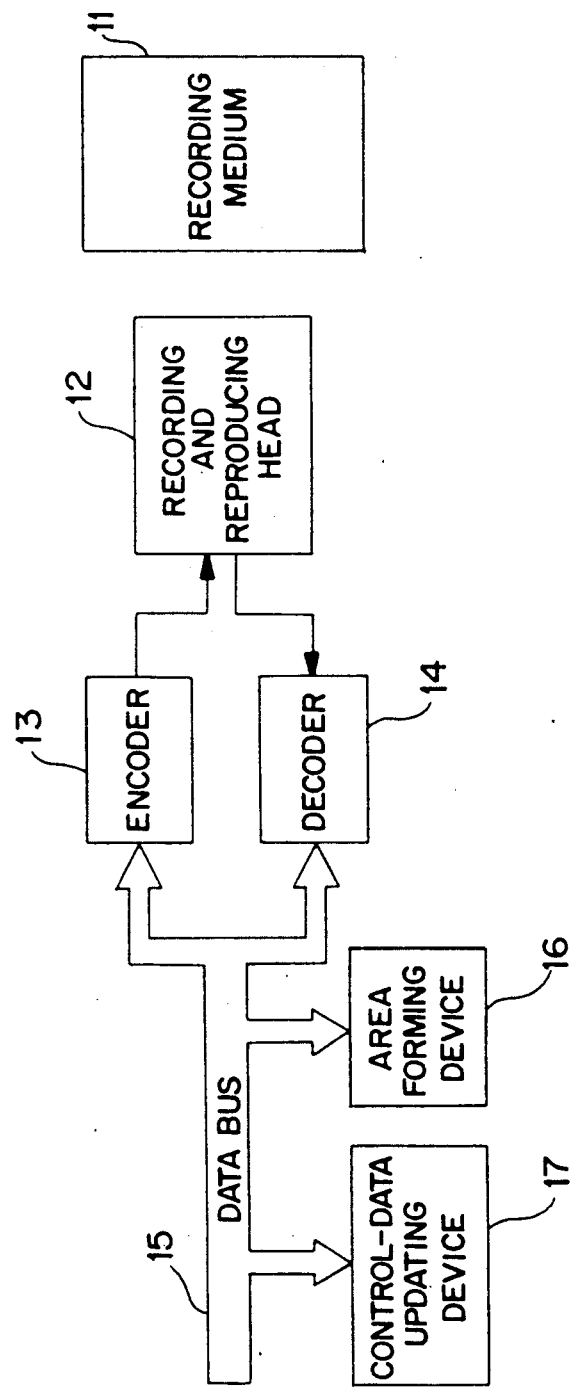
FIG. 3 illustrates the recording and reproducing apparatus of the present invention.

The embodiments of the present invention based on FIG. 1, FIG. 2, and FIG. 3 are as follows:

These indicated embodiment examples concern the optical modulation type recording and reproducing device in which a magneto-optical disk is used as the optical recording medium.

The means for forming the control data recording area is designed to form control data recording area 1, where N+1 units of control data recording blocks are set, as indicated in FIGS. 2 (a) and (b), on the magneto-optical disk. In the individual control data recording block, #O-#N addresses are attached. Here, FIG. 2 (b) indicates a case in which updating of each control data recording block in the control data recording area is done in at least 1 cycle.

The aforementioned control data recording block comprises of multiple sectors of sector 2, which is a record unit, as indicated in FIG. 2 (a), concerning control data recording block of address #2. In this individual sector 2 . . . , the same content of control data is to be recorded, allowing improved reliability.

Also, the aforementioned individual sector 2 . . . can perform independent erase record processing, so N+1 units of control data recording blocks also can individually and indepentently perform control data recording.

The control data to be recorded in this control data recording block comprises an error map that indicates magneto-optical disk conditions and includes alternated addresses, when alternate processing is done, and alternate addresses.

The aforementioned alternate process is a process performed when a defective sector is discovered when access executing is done from the host device or host program. The alternated address is the address which indicates a discovered defective sector. The alternate address indicates the normal sector of an alternate location, which will actually be accessed instead of the defective sector, when host device tries to access defective sector again.

When alternated address and alternate address are determined after alternate processing is done, the control data update processing can be done by the control data updating means. In this case, the control data updating means will record new control data to the control data recording block. This control data recording blocks has recorded control data which was not just subject to prior updating.

Here the hatched control data recording blocks indicate blocks where control data has already been recorded. Consequently, in FIG. 2 (a), control data recording blocks after address #N-2 are unrecorded. In FIG. 2 (b), only address #2 control data recording block is unrecorded.

The program which controls the control data recording area 1 in the aforementioned control data updating means is designed to read out to a RAM. The newest control data, in this embodiment, is always recorded in a control data recording block located just before the unrecorded control data recording block. For example, in FIG. 2 (a), the control data recording block address #N-3 is the control data recording block where the latest control data is recorded, and in FIG. 2 (b), the control data recording block address #1 is indicated.

Based on the FIG. 1 flow chart, the control data updating process of the above structured magneto-optical disk recording and reproducing device is explained.

This control data updating process, first in step S1, makes new control data by adding a new alternated address and alternate address to control data in RAM. This sets up the pointer to the first address #0 of the control data recording block in the control data recording area 1 on the magneto-optical disk. (Step S2)

After a pointer is set up, the process examines if the control data recording block of the pointer-located address is unrecorded or not (Step S3). If this control data recording block is recorded, the pointer advances to the next address by 1, and moves the pointer to the next control data recording block (Step S4). Then it returns to Step S3, thereafter it repeats S3, processing until the unrecorded control data recording block is discovered.

In the case of FIG. 2 (a) and FIG. 2 (b), by repeating Step S3 processing N-1 times, or 3 times respectively, the pointer reaches address #N-2, or address #2, which indicates the unrecorded control data recording block. In this embodiment, control data recording area 1 always has more than 1 unrecorded control data recording blocks, this to be explained later.

In Step S3, if the control data recording block is determined unrecorded, the new control data in previously mentioned RAM is recorded into the pointer-indicated control data recording block Step (S5). Usually when optical modulation type magneto-optical disks rewrite recording, it is necessary to erase the part first. However, recording in this embodiment is done in the already unrecorded control data recording block, so an erase operation becomes unnecessary. Even if new control data in RAM is lost, because of electric power failure immediately after alternate processing, the control data thus far is always stored in control data recording area 1.

When new control data recording is completed, Step S5 ends confirming this data. When new control data recording and confirmation ends, it is determined if the present address pointer indicates the last address #N or not (Step S6). If not the last address, the pointer address advances by 1, and moves to the next control data recording block (Step S7).

It is then examined if control data recording block of the pointer-indicated address that advanced by 1 in the above Step S7 is unrecorded or not Step (S8). If recorded, the control data recording block of the pointer-indicated address will be erased (S9). In other words, the oldest control data recording block is erased, and the update process ends.

For example, in FIG. 2 (b), if new control data is recorded in the control data recording block of address #2, the control data recording block of address #3 is recorded. So it advances from Step S8 to Step S9, and the control data recording block of address #3 will be erased.

In Step S8, if the control data recording block is unrecorded, it completes update processing as it is. For example, in FIG. 2 (a), if new control data is recorded in the control data recording block of address #N-2, address #N-1 is unrecorded, so according to the decision of Step S8, update processing is immediately terminated.

On the other hand, in previously mentioned Step S6, if the address pointer indicates the last address #N when new control data recording and confirmation ends. In other words, when new control data is recorded in the control data recording block of last address #N in Step S5, and control data recording block of the next address does not exist, it moves to Step S10.

In Step S10, after returning the pointer to initial address #O, it moves to Step S9, and this control data recording block of the first address #O is erased. In this case as well, the oldest control data recording block is erased. In this way, according to this embodiment, the oldest control data recording block is erased every time control data is updated. Hence, more than 1 unrecorded control data recording block always exists, as was previously mentioned.

When control data in control data recording area 1 is updated, the recording and reproducing device of this embodiment can store the previous maximum number of units (N-1 units) of updated data, including those prior to updating.

Especially in the case of optical modulation type magneto-optical disks, as in this embodiment, it is necessary to erase first when recording is to be rewritten. However, if previous control data is stored as mentioned above, even if and unexpected electric power failure occurs, damage can be minimized. At the same time, since the erase operation of the control data recording block is not required until it goes to and returns from control data recording area 1, the update processing time can be shortened.

As mentioned thus far, the optical recording medium recording and reproducing device of the present invention is an recording and reproducing device equipped with a control data recording area, where control data indicating optical recording medium conditions are recorded, for an erasable type optical recording medium. The device comprises a means to form a control data recording area, which forms control data recording areas where more than two control data recording blocks are set. It is structured by more than one record unit and can independently record control data. It has a control data updating means, which records new control data in the control data recording block, excepting control data recording blocks where previously recorded control data was updated when control data of the control data recording area is to be updated. With the arrangement, a conventional recording/reproducing apparatus control data is encoded into a recording signal by an encoder 13 connected to a data bus 15, in accordance with the recording format, and is recorded in the record units in the control data recording block on a recording medium 11 through a recording and reproducing head 12. Further, the control data is reproduced through a process where a reproduced signal obtained by the recording and reproducing head 12 from the record units in the control data recording block on the recording medium 11 is decoded by a decoder 14. This is the special feature.

The aforementioned control data updating means can be structured so that when control data of a control data recording area is updated, new control data will be recorded in the control data recording block where no control data is recorded.

Also, the aforementioned control data updating device 17 can be structured so that when control data recording blocks, where no recorded control data exists, the control data recording block where the oldest control data is recorded, will be erased.

Also, the aforementioned control data updating device 17 can be structured so that corresponding cyclic code to more than two control data recording blocks are recorded in the optical recording medium 11, together with the control data.

Also, the aforementioned control data updating device 17 can be structured so that the number of times control data is recorded can be recorded in the optical recording medium 11, together with the control data.

Also, the aforementioned control data updating device 17, can be structured so that the total number of control data is recorded in the recording and reproducing device, for optical recording medium 11, together with the control data.

Also, the aforementioned control data recording area forming device 16 forms the control data recording area, where more than two control data recording blocks consisting of more than two record units, are set up. On the other hand, control data updating device 17 can be structured so that the same content of control data is recorded in more than two record units in the control data recording block.

Examples of the aforementioned overwriting type optical recording medium include magneto-optical disks, phase transition type optical disks and magneto-optical cards et cetera. The control data recording area is an area where control data, for example error map, is to be recorded.

Therefore, the control data recording area forming device 16 forms the control data recording areas, where more than two control data recording blocks that can independently record control data in optical recording medium 11 format on the optical recording medium. The control data recording block comprises more than one record unit, so that more than two control data recording blocks will not process erasing or rewriting at one time. This record unit usually becomes a sector unit.

When the control data of the control data recording area is updated, the control data updating device 17 records new control data in a control data recording block, excepting the control data recording blocks where control data previously updated was recorded.

Hence, when control data is updated, the control data just previously updated is stored in the optical recording medium 11, without being erased or overwritten.

Consequently, if the recording and reproducing device of the present invention is used, even in cases of electric power failure during update time, since previously updated control data is stored in the optical recording medium, damage can be minimized.

Additionally, when there are no unrecorded control data recording blocks for control data recording, except control data recording blocks where control data was just previously updated, the control data recording block of the oldest recorded control data can be used.

In this case, if designated in advance that when all unrecorded control data recording blocks are gone at update time, the oldest control data recorded in control data recording block will be erased, the control data recording block to be recorded will be easily specified at the next update time, only by searching the unrecorded sector.

In these cases as well, by recording cyclic codes that correspond to more than two control data recording blocks together in the optical recording medium, the unrecorded control data recording block, or the control data recording block where the oldest control data was recorded, can be easily specified.

At the saem time, if the number of control data recordings is recorded in the optical recording medium, the unrecorded control data recording block or the control data recording block where the oldest control data was recorded can easily be specified by determining the remainder of total control data recording blocks from the number of recording times.

Also, in cases where total control data always increases every time an update process is performed, if the total control data is recorded in the optical recording medium recording and reproducing device together with control data, the control data recording block where the newest control data was recorded can easily be specified by searching control data with the largest total number.

Concerning the number of control data recording blocks, it is sufficient if there are more than two. When the number of control data recording blocks are only two, these blocks can be alternately used for the control data recording blocks to record new control data at every update time.

In addition, the optical recording medium recording and reproducing device of the present invention usually comprises of an optical recording medium driver device and a program to control it.

What is claimed is:

1. A recording and reproducing device for recording and reproducing information to and from an optical recording medium provided with a control data recording area having control data recorded therein, the control data showing conditions of the optical recording medium, comprising:
    area forming means for forming a control data recording area, said control data recording area including a pluarlity of control data recording blocks wherein control data are respectively recorded; and
    control data updating means for recording new control data in one of said pluarilty of control data recording blocks during an updating process, said one block having an address one increment greater than an address of a block having control data recorded therein immediately before the recording of said new control data.

2. The optical recording medium recording and reproducing device as claimed in claim 1, wherein said control data updating means records said new control data in a control data recording block having no control data recorded therein.

3. The optical recording medium recording and reproducing device as claimed in claim 2, wherein said control data updating means erases control data recorded in a control data recording block having the oldest control data recorded therein when all of said plurality of control data recording blocks have control data recorded therein after said new control data is recorded.

4. The optical recording medium recording and reproducing device as claimed in claim 1, wherein said control data updating means records corresponding cyclic code for more than two control data recording blocks in the optical recording medium together with the control data.

5. The optical recording medium recording and reproducing device as claimed in claim 1, wherein said control data updating means records a number of times control data is recorded on the optical recording medium together with the control data.

6. The optical recording medium recording and reproducing device as claimed in claim 1, wherein said control data updating means records a total number of recording units of said control data in the optical recording medium recording and reproducing device together with the control data.

7. The optical recording medium recording and reproducing device as claimed in claim 1, wherein said area forming means forms said control data recording area such that said control data recording area has more than two control data recording blocks, each block having more than two recording units;
    said control data updating means records same control data in more than two recording units of a control data recording block.

8. A recording and reproducing device for recording, reproducing and erasing information to and from an optical recording medium provided with a control data recording area having control data recorded therein, the control data showing conditions of the optical recording medium, comprising:
    area forming means for forming a control data recording area, said control data recording area including a plurality of control data recording blocks where control data are respectively recorded; and
    control data updating means for recording new control data in a control data recording block having no control data recorded therein;
    said control data updating means recording said new control data in one of said plurality of recording blocks having no control data recorded therein, said one block having an address one increment greater than an address of a block having control data recorded therein immediately before the recording of said new control data if two or more control data recording blocks have no control data recorded therein; and
    said control data updating means erasing contents of a recording block having oldest control data recorded therein if all of said plurality of recording blocks have control data recorded therein after recording said new control data.

9. The optical recording medium recording and reproducing device as claimed in claim 8, wherein said control data updating means records corresponding cyclic code for more than two control data recording blocks in the optical recording medium together with the control data.

10. The optical recording medium recording and reproducing device as claimed in claim 8, wherein said control data updating means records a number of times control data is recorded on the optical recording medium together with the control data.

11. The optical recording medium recording and reproducing device as claimed in claim 8, wherein said control data updating means records a total number of recording units of said control data in the optical recording medium recording and reproducing device together with the control data.

12. The optical recording medium recording and reproducing device as claimed in claim 8, wherein said area forming means forms said control data recording area such that said control data recording area has more than two control data recording blocks, each block having more than two recording units;

said control data updating means records same control data in more than two recording units of a control data recording block.

13. A method for recording new control data on an optical recording medium, comprising the steps of:
   (a) forming a control data recording area having a plurality of recording blocks on the optical recording medium, each recording block having a distinct address;
   (b) setting a pointer to an initial address value;
   (c) determining if the recording block corresponding to the address value of the pointer has no control data recorded therein;
   (d) incrementing the address value of the pointer if said step (c) determines that the recording block has control data recorded therein;
   (e) repeating said steps (c) and (d) until said step (c) determines that the recording block has no control data recorded therein; and
   (f) recording new control data in the recording block corresponding to the address value of the pointer when said step (c) makes an affirmative determination.

14. The method as claimed in claim 13, further comprising the steps of:
   (g) setting a maximum address value corresponding to a maximum number of recording blocks in the control data recording area;
   (h) determining if the address value of the pointer is equal to the maximum address value after executing said step (f);
   (i) setting the pointer to the initial address value when said step (h) makes an affirmative determination; and
   (j) erasing the control data recorded in the recording block corresponding to the initial address value after the execution of said step (i).

15. The method of claimed in claim 14, further comprising the steps of:
   (k) incrementing the address value of the pointer when said step (h) makes a negative determination;
   (l) determining if the recording block corresponding to the incremented address value of said step (k) has no control data recorded therein; and
   (m) erasing the control data in the recording block corresponding to the address value of the pointer when said step (l) makes a negative determination.

16. The method as claimed in claim 13, further comprising the step of:
   (g) incrementing the address value of the pointer after executing said step (f);
   (h) determining if the recording block corresponding to the incremented address value of said step (g) has no control data recorded therein; and
   (i) erasing the control data in the recording block corresponding to the address value of the pointer when said step (h) makes a negative determination, thereby erasing the oldest recorded control data after recording the new control data.

* * * * *